United States Patent

[11] 3,592,510

[72] Inventor Vernon D. Heitfield
  Leesburg, Va.
[21] Appl. No. 812,466
[22] Filed Apr. 1, 1969
[45] Patented July 13, 1971
[73] Assignee Aerospace Industrial Associates, Inc.
  Purcellville, Va.

[54] WHEEL ASSEMBLY
  10 Claims, 2 Drawing Figs.
[52] U.S. Cl. .................................................... 301/5.7,
  301/63 PW, 308/191
[51] Int. Cl. ..................................................... B60b 5/02
[50] Field of Search ........................................... 301/5.3,
  5.7, 63 PW; 308/188, 189, 190, 191

[56] References Cited
UNITED STATES PATENTS
1,943,881  1/1934  Ware ............................ 301/5.7
2,266,042  12/1941  Hufferd ........................ 301/5.7 X
2,300,444  11/1942  Ware ............................ 301/5.3
2,664,317  12/1953  Glynn ........................... 301/5.3
FOREIGN PATENTS
871,118  6/1961  Great Britain ................ 301/5.7

Primary Examiner—Richard J. Johnson
Attorney—Cushman, Darby & Cushman

ABSTRACT: A wheel assembly having a wheel portion of a similar plastic, with integrally cast bearing races and method of casting same whereby said bearing races are secured and maintained in proper alignment within said wheel portion through exploitation of the inherent characteristics of said plastic and by means of the unique design of said races. The characteristics exploited include shrinkage of the plastic material to properly treated metal surfaces.

PATENTED JUL 13 1971  3,592,510

INVENTOR
VERNON D. HEITFIELD

BY Cushman, Darby & Cushman
ATTORNEYS

WHEEL ASSEMBLY

The present invention relates to wheel assemblies in general and more particularly to roller skate wheel assemblies made of urethane rubber or of some other plastic having similar characteristics, wherein the wheel assembly has bearing races for what is known as loose ball bearings, and wherein the races are cast as integral parts of the wheels during the initial manufacturing process. The invention also relates to a method of casting wheel assemblies wherein the casting process insures that the races will maintain proper alignment and mechanical rigidity during use.

In the past the insertion of bearing races in roller skate wheels has been accomplished after the casting process has been completed. This procedure has proved satisfactory but suffers from several major disadvantages since the race is not an integral part of the wheel and can only be held in place by a mechanical crimping action to deform the plastic wheel or through the application of some form of cement. Prior art bearing races for loose ball wheels have been so weak that their use has been restricted to wheels made only of certain materials thereby limiting the use of other plastic materials, which otherwise have many advantageous properties. In addition, the use of precision ball bearings has been necessary. Precision ball bearings are much more expensive than loose ball bearings and, for certain applications in roller skating, are not as satisfactory.

An additional disadvantage present in prior art wheel assemblies is that the races must be inserted from opposite sides of the wheels, and thus, tend to align themselves with the outer radius of the precast cavities in the wheels. Because all plastics tend to deform during the cure cycle, the races do not necessarily align themselves properly with respect to the true rotational axis of the wheel.

This invention provides for the casting of bearing races as integral parts of plastic roller skate wheels, and further relates to the method of casting these bearings in such a manner that they will maintain proper alignment and mechanical rigidity under the stresses and heavy loading conditions encountered in use. The invention involves casting the bearing races in a back-to-back configuration wherein the races are placed on a mandrel and inserted into the cavity and then aligned to the true axis of the wheel. The races are finally held together within the wheel portion by compression due to the material shrinkage of the plastic in the wheel during the cure cycle of the plastic. The outer diameter of the mandrel is the same as the diameter of the inside of the race cavity, thereby excluding the plastic from the surface of the race against which the balls will roll.

The cast wheels and the process involved are peculiarly applicable to wheels made of urethane rubber. However, any plastic material which tends to shrink on curing, and would be otherwise suitable, could be used.

An object of the present invention is the provision of a unique wheel assembly wherein bearing races are integrally cast into the plastic wheel portion of the assembly.

Another object is to provide a method for producing wheel assemblies.

Still another object is the provision of a unique bearing race to be used in the wheel assembly.

Other objects and features of the invention will become apparent to those of ordinary skill in the art as the disclosure is made in the following description of preferred embodiments of the invention as illustrated in the drawings in which.

Figure 1:
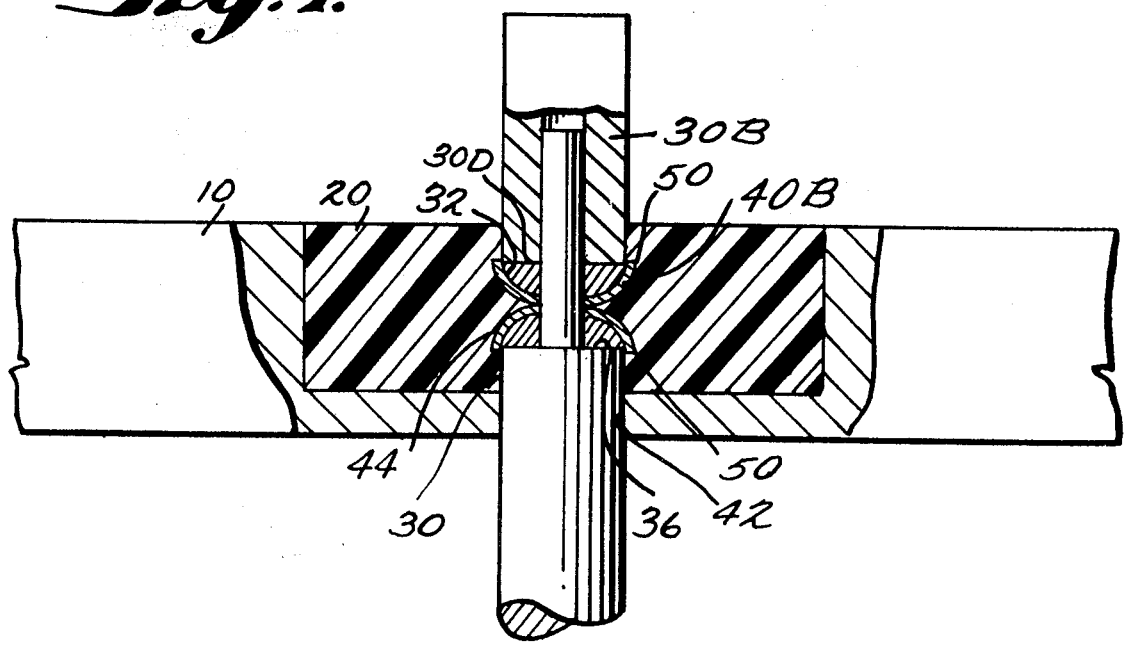
FIG. 1 is a cross section of the wheel assembly during the casting process.

Reference is now made to FIG. 1 wherein the mold 10 used in the process of this invention is prepared for the pouring of the plastic 20 which constitutes the wheel, by inserting a mandrel 30 into the mold in such a manner that the mandrel coincides with the rotational axis of the wheel to be cast. The mandrel 30 preferably includes a male insert 30A, a mating female member or insert 30B, and two elastic seals 30C and 30D, so configured as to exclude the plastic 10 from the inner cavities of races 40A and 40B. Insert 30A is sized to the inner edge 32 diameter of the inner cavity of races 40A and 40B and is a sliding fit for the hole diameters at 34 of the races. Similarly, 30B is sized to the same outer diameter at 32 as 30A, but it is drilled to be a sliding fit over the male mandrel 30A. The elastic seals 30C and 30D are precast onto 30A and 30B in such a manner that 30C will adhere to 30A and 30D will adhere to 30B. In addition, the seals are cast to the shape of the void which would otherwise exist between those portions 36 of the mandrel 30 and the interior surfaces of the bearing races.

In preparing the mold 10 for pouring, male insert 30A with seal 30C attached thereto is inserted through the mold 10 at the mold aperture 42. Bearing races 40A and 40B are then placed over insert 30A in such a manner that the concave surface of race 40A faces the bottom of the mold 10 and fits over the elastic seal 30C and the concave surface of upper race 40B faces the top of the mold. The female member 30B of mandrel 30 is then placed over the insert 30A in such a manner that its elastic seal 30D fits into the concave surface of race 40B. The concave surfaces of the races are, thus, effectively sealed so that plastic cannot come into contact with these surfaces.

It should be noted that mandrel 30 and races 40A and 40B could be completely assembled prior to insertion of mandrel 30 into mold 10 without affecting the results of the process or the desirable properties of the wheel assembly ultimately formed.

The mold is now ready to be filled with plastic 20 to form the wheel portion of the assembly. A lip 50 is formed on each of the races which is equal to the thickness of the material from which each race is made. The plastic then fills the mold and flows around mandrel 30 and bearing races 40A and 40B. Since urethane rubber and other suitable materials tend to shrink on curing, pressure is applied upon the curing of the plastic to the races through lips 50 so as to force the races into firm mechanical contact with each other in such a manner that they structurally reinforce each other. As the plastic cures further, the internal stresses within the plastic tend to align themselves with respect to the mandrel 30, and with respect to the races in such a manner that any stress-caused deformation subsequent to cure will not be permanent and will be only temporary so that the wheel portion and the races will return to the desired alignment with respect to the rotational axis of the wheel upon removal of the stress.

Further strengthening of the assembly can be obtained by treating the surfaces 44 of the races with a cementing material which will cause the plastic 20 to adhere to the races upon curing thereof. Many such cementing materials are well known to the art and the type of cementing material used forms no part of this invention.

Figure 2:
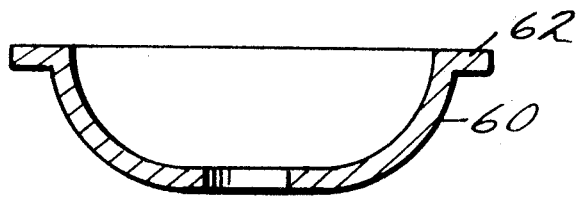
FIG. 2 is a cross section of a unique race which may be used in the wheel assembly of this invention.

Reference is now made to FIG. 2 which represents a unique race 60 which provides even greater strength to the wheel assembly of this invention. The races shown in FIG. 1 are presently known; however, FIG. 2 embodies a unique race with an extended flange 62 which increases the gripping area of the plastic 10 upon the race. Flange 62 is used to replace the lip 50 discussed with respect to FIG. 1, while all other portions of the respective races are the same.

This invention thus provides for a unique wheel assembly and method for producing same wherein the assembly may use a unique bearing race or races which have heretofore been known in the art. While the discussion herein has primarily referred to roller skate wheels, the process is not necessarily unique to the manufacture of roller skate wheels and would be equally applicable to any wheel assemblies wherein it would be advantageous to use free ball bearings with the races integrally cast into the wheels.

It should be understood that the foregoing disclosure relates to only preferred embodiments of the invention and that numerous modifications or alterations may be made therein without departing from the spirit and the scope of the invention as set forth in the appended claims.

What I claim is:

1. A wheel assembly, comprising:
a cast wheel including cured material which shrinks upon curing; and
a plurality of cup-shaped bearing races held firmly together by said cured material and integrally cast in back-to-back metal contact within said wheel for receiving loose ball bearings therein.

2. A wheel assembly as in claim 1 further including:
means for causing the cured material to adhere to predetermined areas of said bearing races.

3. A wheel assembly as in claim 1 wherein each of said bearing races includes a portion for engagement with said cured material to enable the forcing of said races together in a mechanically rigid configuration by said cured material upon shrinkage thereof.

4. A wheel assembly as in claim 3 wherein said portion corresponds to the thickness of each of said respective races.

5. A wheel assembly as in claim 3 wherein said portion includes an extended lip at an outer edge of each of said races.

6. A wheel assembly as in claim 1 wherein said material includes urethane rubber.

7. A wheel assembly of unusually strong and durable construction, comprising:
a cast plastic wheel;
said plastic including material which shrinks upon curing;
two bearing races integrally cast within said wheel in back-to-back configuration;
each of said races including a portion for engagement with said cured plastic to cause the forcing together of said races in a mechanically rigid and durable configuration by said cured plastic upon shrinkage of said plastic.

8. A wheel assembly as in claim 7 wherein said plastic includes urethane rubber.

9. A wheel assembly as in claim 8 wherein each of said races include an aperture therein corresponding to the rotational axis of said assembly.

10. A wheel assembly as in claim 7 wherein said portion for engagement with said cured plastic includes a lip extending outwardly from each of said races.